(12) United States Patent
Coulson

(10) Patent No.: US 6,345,015 B1
(45) Date of Patent: Feb. 5, 2002

(54) TOOTH BRUSHING TIMER

(76) Inventor: Lonnie Coulson, 2511 Stella St., Fairmont, MN (US) 56031

( * ) Notice: Subject to any disclaimer, the term of this patent is extended or adjusted under 35 U.S.C. 154(b) by 0 days.

(21) Appl. No.: 09/524,375

(22) Filed: Mar. 13, 2000

Related U.S. Application Data

(60) Provisional application No. 60/138,526, filed on Jun. 10, 1999.

(51) Int. Cl.7 ............................................... B04B 47/00
(52) U.S. Cl. .......................................... 368/10; 368/107
(58) Field of Search ........................... 368/10, 101–113, 368/89, 223

(56) References Cited

U.S. PATENT DOCUMENTS

| 1,923,978 | A | 8/1933 | Hill |
| 2,132,474 | A | 10/1938 | En Holm |
| 2,926,487 | A | 3/1960 | Stone |
| 3,783,364 | A | 1/1974 | Gallanis et al. |
| D247,225 | S | 2/1978 | Beckwith |
| D258,806 | S | 4/1981 | Mericle et al. |
| D278,801 | S | 5/1985 | Long |
| RE32,576 | E | 1/1988 | Pastore |
| 4,836,415 | A | 6/1989 | Grussmark |
| 4,934,940 | A | 6/1990 | Savery |
| 4,991,755 | A | 2/1991 | Grusmark |
| D330,822 | S | 11/1992 | Steiner |
| 5,184,959 | A | 2/1993 | Oryhon et al. |
| 5,438,726 | A | 8/1995 | Leite |
| 5,561,881 | A | 10/1996 | Klinger et al. |
| 5,570,325 | A | 10/1996 | Arpadi |
| 5,629,527 | A | 5/1997 | Levitt et al. |
| D380,164 | S | 6/1997 | Galla |
| 5,638,339 | A | 6/1997 | DeLoretto et al. |
| D394,013 | S | 5/1998 | Morelli et al. |

Primary Examiner—Bernard Roskoski
(74) Attorney, Agent, or Firm—Haugen Law Firm PLLP

(57) ABSTRACT

A tooth brushing timer apparatus disposed within a tooth-configured housing which presents a visual representation of the time elapsed for the brushing of teeth. Following activation, the user-adjustable timing indicator provides a visual display of the elapsing tooth brushing time, further providing an audible signal upon reaching the end point. In addition, the timer apparatus may stand alone or be movably mounted on a stationary support.

7 Claims, 4 Drawing Sheets

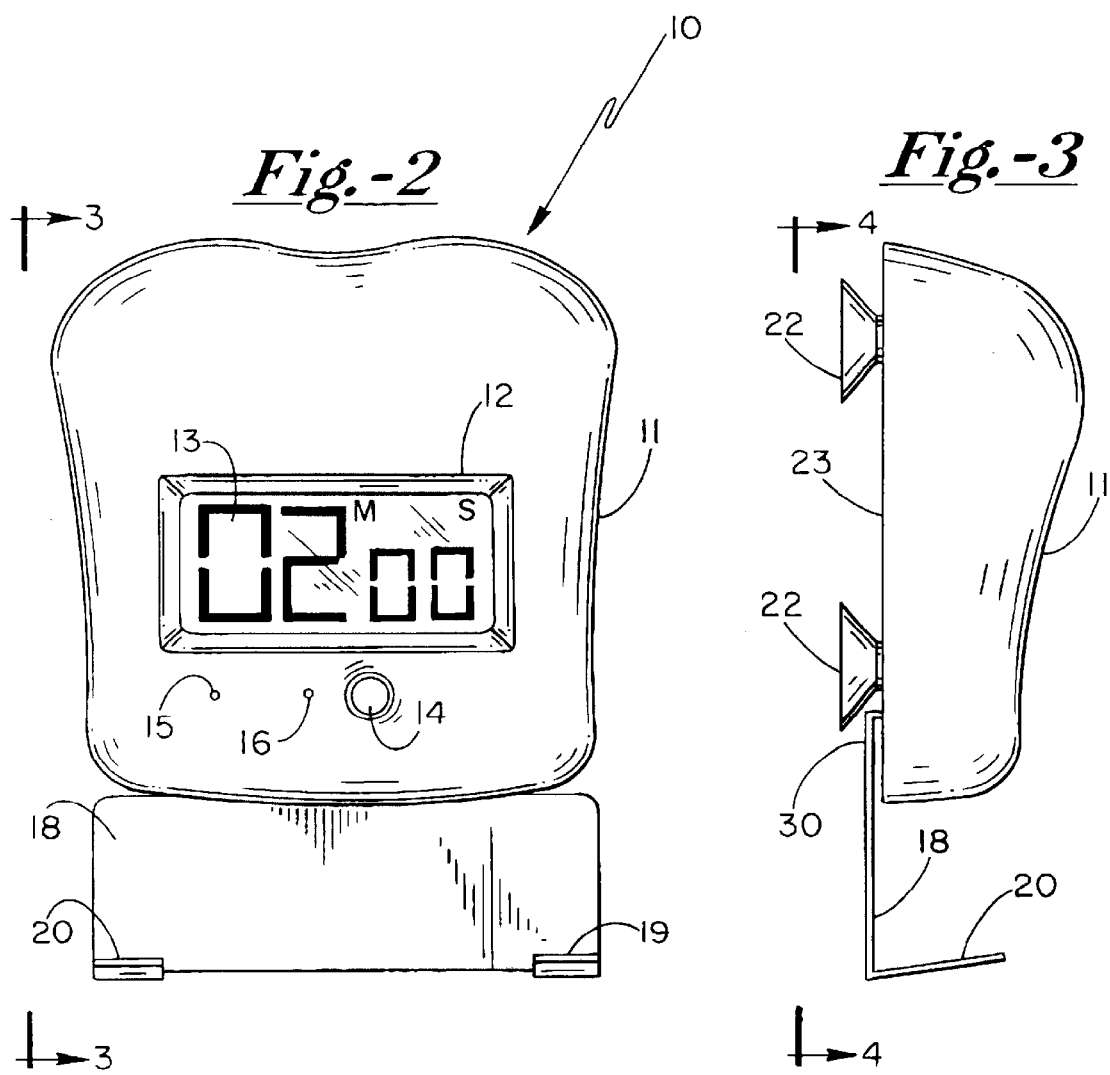

TOOTH BRUSHING TIMER

CROSS-REFERENCE TO RELATED APPLICATION

The present application relates to the subject matter set forth in my co-pending Provisional Application Ser. No. 60/138,526, filed Jun. 10, 1999, entitled "TOOTH BRUSHING TIMER".

BACKGROUND OF THE INVENTION

The present invention relates to a device that encourages good dental hygiene, and more particularly to a device which provides a visual readout of elapsed time to assist the user in appreciating an awareness for elapsed brushing time. While the device is particularly adapted for use in training young persons, it is also well suited for use by older and more mature persons including adolescents and adults. The goal of providing the encouragement is accomplished by providing an easy to use electronic timer enclosed in a housing which is in the configuration of an attractive and healthy tooth, such as a plastic model of a molar. Means are provided to detachably mount the device on any flat surface, such as a bathroom mirror, wall, cabinet surface, or the like. Alternatively, the device may be provided with base supports so as to provide a stand-mount for use on a horizontal surface such as a shelf or countertop adjacent the bathroom sink. In addition to these features, the housing is provided with cradle means for holding one or more toothbrushes in horizontal position between uses.

In order to provide additional focus for the user, the timer is positioned within an opening or window in the wall of the tooth-configured housing. By placing the timer in this location, the user may more readily appreicate and associate the benefits of good dental hygiene.

While various timers have been available in the marketplace, timers have been utilized with toothbrushes, the currently available timers have limited capability. One such timer is a two-minute timer enclosed within the handle of an electric toothbrush marketed by Comtrad Industries under the trade designation "Braun's® Oral B®" electric toothbrush. The device of the present invention provides advantages in that it is time-adjustable, and provides a constant and visual digital countdown of the time remaining for the brushing operation. It is a feature of the present invention to provide an adjustable timer so that the duration or span of brushing may be adjusted to suit the needs of the user. While a two-minute brushing schedule may be appropriate for certain individuals, various other periods may be more appropriate for those with special needs, including those undergoing orthodontic treatment, or those on a home-treatment program for a gum disorder. Accordingly, the present invention encourages the user to admire the shiny white tooth surrounding the timer which is being observed during the countdown interval. Parents are well aware of the difficulties frequently encountered in persuading children to brush their teeth effectively, and for an appropriate and desired duration. The present invention provides several aids to help children and adults to successful dental hygiene.

In the past, it has been proposed to house timers within replicas of teeth, however the present device provides a mounting means within the replica of a tooth along a relatively smooth planar surface. Furthermore, the preferred apparatus of the present invention provides an adjustability feature to permit adjustment to suit special needs of users. Additionally, the configuration of an arrangement of the device of the present invention facilitates its mounting on a convenient bathroom surface, such as on the surface of a mirror, or alternatively the device may be provided with pedestal mounts to accommodate stand-alone positioning.

SUMMARY OF THE INVENTION

In accordance with the present invention, therefore, an adjustable-duration electronic timer is positioned within a window formed in the plastic model of a healthy tooth, with the timer being of the digital countdown type having a prominent and highly visible digital readout. The housing is provided with detachable mounting means to enable the device to be mounted on a convenient flat surface, and may also be provided with cradle means to support a toothbrush between uses. The detachable mount, such as in the form of one or more suction cups on the rear surface facilitate placement in an appropriate and readily accessible location. The adjustability feature permits the duration or interval to be adjusted to the user's requirements, and the attractive white tooth housing provides an ongoing reminder to the user of the benefits of good dental hygiene.

Therefore, it is a primary object of the present invention to provide a device for use in training children, adolescents, as well as adults to brush their teeth for appropriate minimum lengths of time, in order to provide for better dental hygiene.

It is a further object of the present invention to provide a device that is interesting and will capture and hold the attention of the user, particularly when the user is a child.

It is yet a further object of the present invention to provide a device that is simple to utilize, so that youngsters may be trained to employ the device while brushing their teeth.

It is yet a further object of the present invention to provide detachable mounts for the device along with cradle means for retaining a toothbrush in place between periods of use.

Each of these objects is accomplished by providing an adjustable electric digital timer of the countdown type with appropriate memory, and preferably with an audible indication of reaching a "zero" point in the countdown cycle. Since the timer is enclosed within an attractive housing, specifically the model of a healthy tooth, it may be displayed in a residential bathroom as an attractive and useful object.

IN THE DRAWINGS

FIG. 2 is a front elevational view of the assembly of FIG. 1;

FIG. 3 is a side elevational view of the assembly of FIG. 2, taken along the line and in the direction of the arrows 3—3 of FIG. 2;

DESCRIPTION OF THE PREFERRED EMBODIMENT

Figure 1:
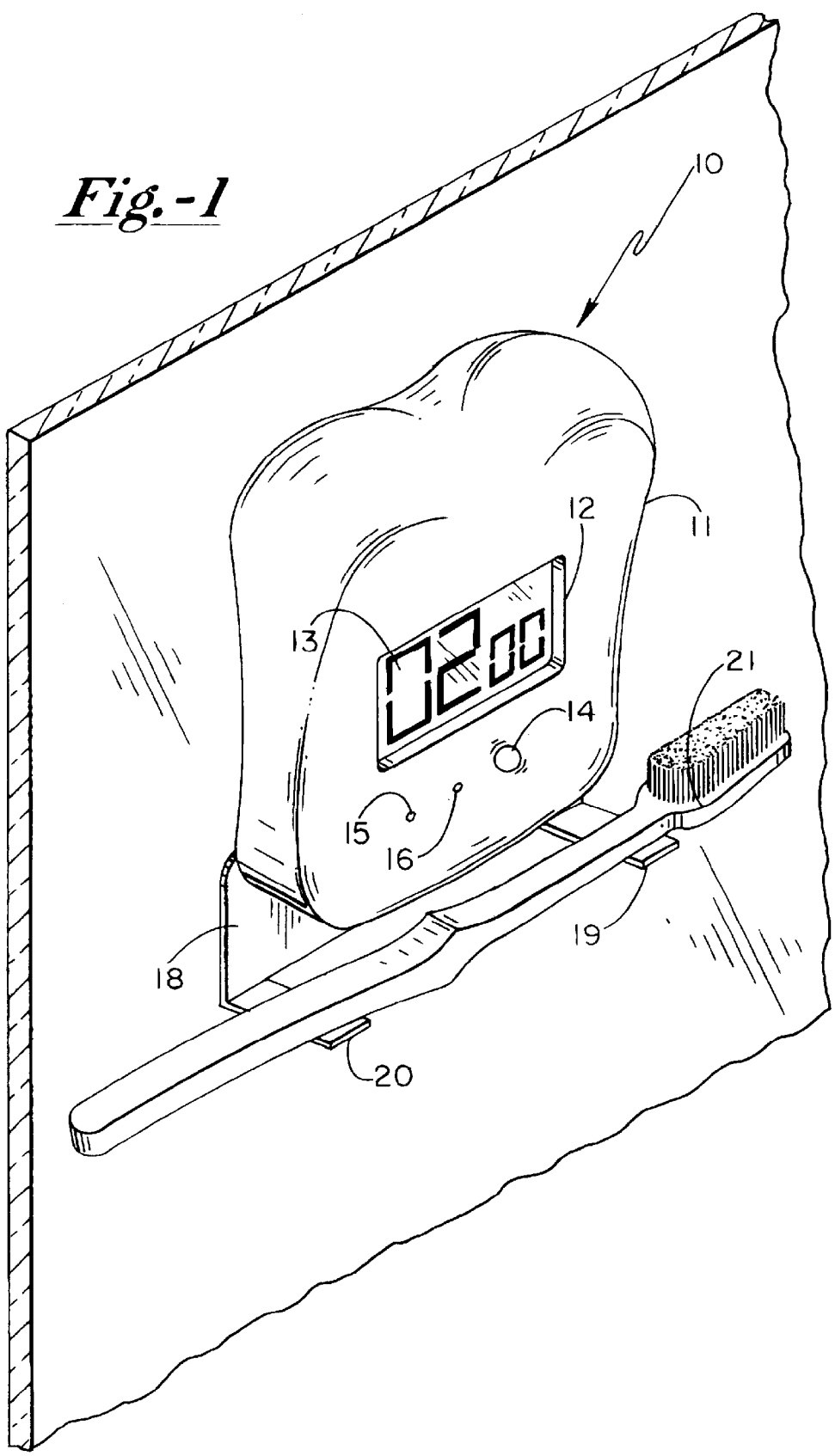
FIG. 1 is a perspective view of the tooth brushing timer device of the present invention mounted on a mirror surface.

With attention being directed to FIG. 1, the present invention comprises a timer apparatus generally designated 10 which includes a housing 11 preferably in the form of a plastic molded model of a tooth, with the timer apparatus 10 including a holder assembly 18. The housing member 11 having an opening or window formed therein as at 12 which is molded to a size that will easily and conveniently retain or house the timing mechanism with a digital readout as at 13. The timer is a digital countdown type, and preferably includes an audible means for providing a signal upon reaching the zero point. The mechanism for the timer is retained within the body of the tooth model, with the thickness of the body of the timer being sufficiently small to permit a relatively thin profile for the overall structure.

The transparent window or opening 12 in the body of the tooth enables the utilization of a timer which permits the presentation of bold digits which are large and accordingly prominent. The readout portion of the timer is visible in the window 12, with the opening being tailored so that the digits forming the readout occupy substantially the entire height of the window. Immediately below the digital window a bore just large enough to view and actuate the start/stop button 14, with the button being positioned within the bore. Finger pressure is sufficient to actuate the mechanism. Digital readout devices of this type are, of course, commercially available. Along the same axis as the bore are two smaller bores 15 and 16 used to adjust the duration of the readout, with bore 15 adjusting the minutes and with bore 16 adjusting the seconds. These bores are preferably of restricted size in order to prevent children from tampering or otherwise interfering with the preset brushing time. An interval of two minutes is normally recommended, although as indicated above, longer durations may be appropriate for certain individuals of special needs. The adjustment buttons located within the small bores can be adjustably actuated by using a toothpick through the restricted bores 15 and 16.

Figure 4:
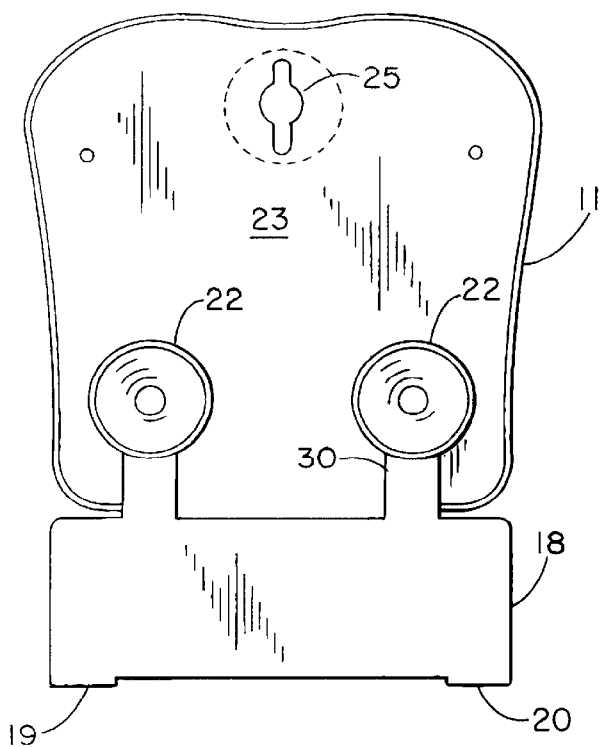
FIG. 4 is a rear elevational view of the assembly of FIG. 1, taken along the line and in the direction of the arrows 4—4 of FIG. 3.

With attention being directed to FIGS. 3 and 4, viewing the tooth-configured housing from a rear elevational view, the timer is mounted within the confines of the housing so that it is firmly in place and appropriately in alignment with the openings in the front surface. Three small suction cups 22—22, arranged in a triangular configuration, are fitted into keyhole slots as at 25 in FIG. 4 formed in the rear planar surface 23 for releasably mounting the device in place. These suction cups 22—22 are used to releasably fasten or mount the device, preferably on the surface of a bathroom mirror, where it is accessible yet in an out-of-the-way location. Toothbrush holder or cradle 18 and 20 retains a conventional toothbrush as at 21, and extends downwardly to just below the body of the device to hold all of the common sizes of brushes. Toothbrush cradles or holders may be positioned or mounted in other configurations as well.

The preferred dental hygiene timing device in accordance with the present invention includes an adjustable countdown digital timer with memory, thereby permitting the timer to return from the preset time interval indicated during the start of the cycle down to a "zero" position. This means that the timer will return to zero from the preset time after the start button has been actuated or pressed, and the timer has completed its countdown cycle. Since the timer is housed within the confines of the tooth, the model is preferably of a size of about four inches high, four inches wide, and one inch deep. Other sizes may be appropriately selected as well. Additionally, the toothbrush holder assembly 18 includes cradles 19 and 20 which typically depend or extend below the housing 11 and are preferably of a size of about one inch in height, with a width generally about equal to the width of the housing 11.

While the suction cups have been indicated as being mounted in three keyhole slots formed in the rear surface of the tooth, other mounting mechanisms or means may be employed as well. Suction cups have been found desirable since they permit the device to be releasably attached to a bathroom mirror or the like. Alternative means such as the utilization of a convenient hanging member may be employed as well.

Keyhole slots as shown at 25 in FIG. 4 may be utilized to mount the device. The timer mechanism is shown at 27 in FIG. 5, with catch means as at 28—28 and better seen at cross-section A—A (FIG. 5A), being utilized to couple the mechanism directly to the housing along mounting abutments as at 29—29. The holder assembly 18 has mounting hook members as at 30 (FIG. 3) which may conveniently fit into the lower slots of the two way keyhole slots formed in the rear of panel 23 and as at 25 in FIG. 6.

The toothbrush holder assembly 18 with cradles 19 and 20 is optional and may be attached to the rear surface of the housing by insertion of appropriate tabs into receiver slots.

Figure 5A:
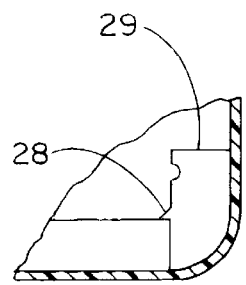
FIG. 5A is a sectional view taken along the line and in the direction of the arrows A—A of FIG. 5.
Figure 5:
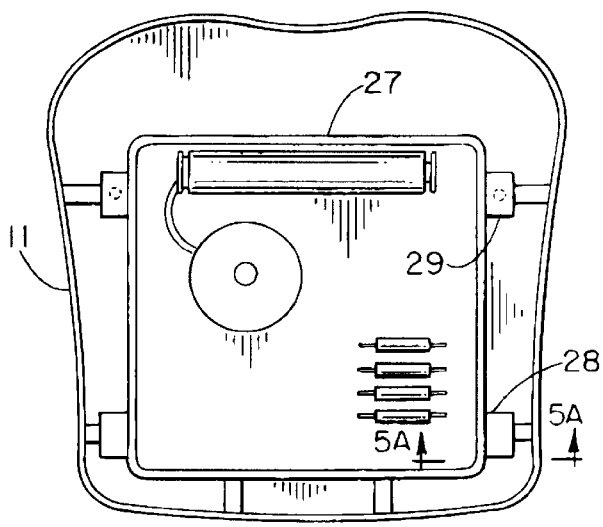
FIG. 5 is a view similar to FIG. 4 with back closure plate removed.
Figure 6:
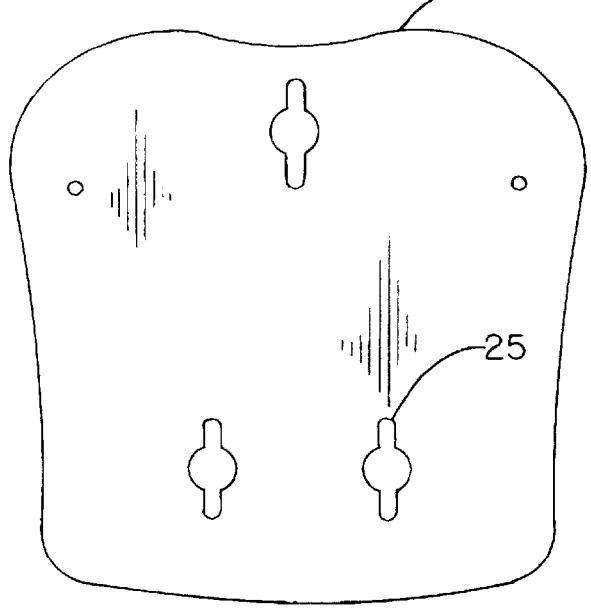
FIG. 6 is an elevational view of the back closure plate.
Figure 7:
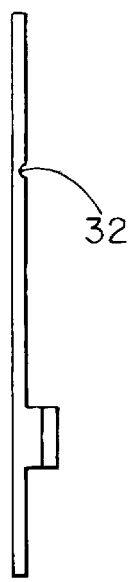
FIG. 7 is an elevational view of the side edge of the back closure plate.
Figure 8:
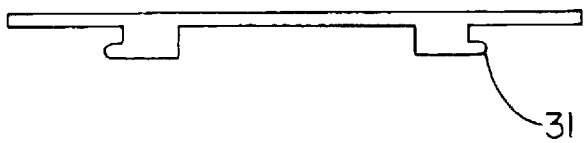
FIG. 8 is an elevational view taken along the bottom edge surface of the back closure plate.

The tooth cover 23 in FIG. 7 is hinged as at 32 below the top keyhole to enable access to the timer battery. The lower portion of cover 23 is attached by sliding the cover down into mating tongue and grooves (as shown in FIG. 5A at Section A—A), the grooves located in the lower abutments, and the tongues located on the underside of cover 23 as seen in FIG. 8 at 31. This enables the user to access the battery by removing only the screws or screw that holds the top portion of the cover and limits the intrusion of the timer.

It will be appreciated that variations and modifications may be made without departing from the spirit of the present invention. Therefore, it should be clearly understood that the form of the present invention described and shown in the figures of the accompanying drawings are illustrative only and are not intended to limit the exact form of the present invention.

What is claimed is:

1. A timer apparatus for providing visual indication of time progression for the duration of tooth brushing, the timer comprising, in combination, a housing and a timing mechanism; the combination being characterized in that;
   (a) said housing has the configuration of a human tooth, with said housing including a hollow interior portion correspondingly dimensional to receive said timer mechanism within;
   (b) said timing indicator being disposed within said housing and arranged to indicate a pre-selected user-adjustable time period, with said timing indicator providing a visual display of the elapsed portion of the adjustable tooth brushing time;
   (c) a holder assembly means detachably mounted on said housing and configured to support a plurality of dental hygiene devices thereon;
   (d) a releasable coupling means whereby said housing may be removably mounted on a stationary surface; and
   (e) an electronic timer that includes a digital readout display, and further including a plurality of restricted-size finger inaccessible bores on a manually accessible portion of said housing for controllably adjusting said user-selected period of time for the duration of tooth brushing.

2. The timer apparatus of claim 1, wherein said housing includes a window opening for displaying a readout from said timing indicator representing said elapsed tooth brushing time therethrough.

3. The timer apparatus of claim 1, wherein said timing indicator includes a button disposed on an accessible portion of said housing for selecting and initiating said user-selected period of time for the duration of tooth brushing.

4. The timer apparatus of claim 1, wherein said timing indicator includes an audible means for providing a signal upon reaching the end of said user-selected period of time for the duration of tooth brushing.

5. The timer apparatus of claim 1, wherein said housing includes a plurality of slots formed therein for releasably retaining and engageable with said holder assembly.

6. The timer apparatus of claim 1, wherein said releasable coupling means includes a plurality of slots, each being engageable with a mounting device adapted to be secured to a vertical stationary surface.

7. The timer apparatus of claim 1, wherein said means for movably mounting said housing includes a plurality of base supports so as to provide a stand-mount for use on a horizontal stationary surface.

* * * * *